Dec. 18, 1951 W. F. COOK 2,579,031
PISTON RING
Filed June 5, 1947
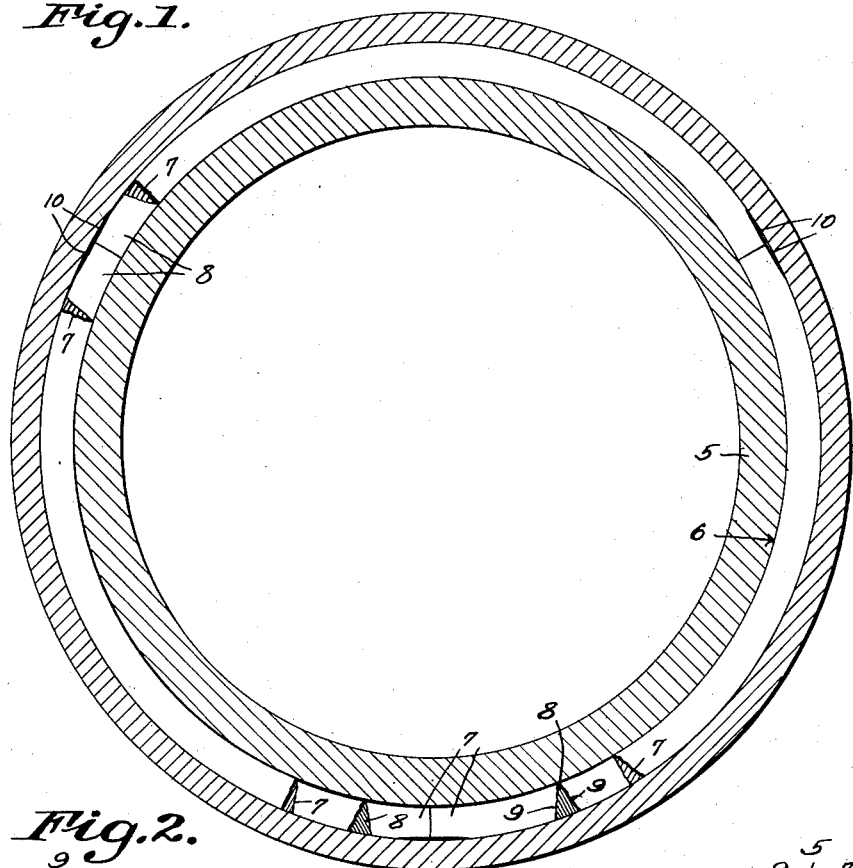
Fig.1.
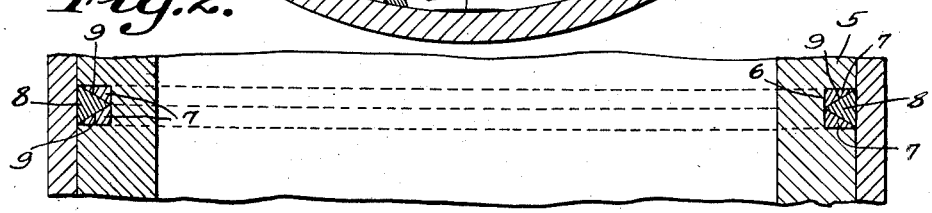
Fig.2.
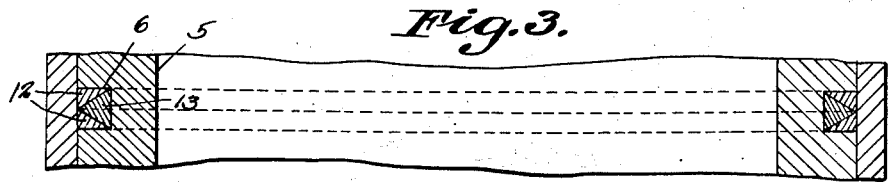
Fig.3.
Fig.4.
Fig.5.
W. F. Cook
INVENTOR
BY C. A. Snow & Co.
ATTORNEYS.

Patented Dec. 18, 1951

2,579,031

UNITED STATES PATENT OFFICE 2,579,031

PISTON RING

William F. Cook, San Diego, Calif.

Application June 5, 1947, Serial No. 752,624

1 Claim. (Cl. 309—44)

This invention relates to piston packing or piston ring construction, the primary object of the invention being to provide a ring embodying a plurality of sections so arranged with respect to each other and so constructed that a wedging action is set up between the rings to cause the rings to expand into close engagement with the wall of the groove in which the ring is mounted, to insure a close fit between the piston and its cylinder.

An important object of the invention is to so construct the sections of the piston ring, that smooth ends are provided on the ring sections, to insure against the ends of the ring sections scoring the cylinder wall in which the ring and piston carrying the ring, operate.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a sectional view through a piston and cylinder wall, illustrating a piston ring, constructed in accordance with the invention, as carried by the piston.

Figure 2 is a vertical sectional view through the piston and cylinder wall.

Figure 3 is a fragmental sectional view through a piston and cylinder wall, illustrating a modified form of the invention.

Figure 4 is a fragmental perspective view illustrating one end of one of the sections of the ring.

Figure 5 is a fragmental perspective view of one end of the central or wedge section of the ring.

Referring to the drawing in detail, the reference character 5 indicates the usual piston, formed with the ring groove 6, in which the piston ring, forming the subject matter of the present invention, is mounted.

The piston ring comprises side ring sections 7 and the central ring section 8, the inner surfaces of the ring sections 7 being beveled, as clearly shown by Figure 2 of the drawing, to cooperate with the beveled outer surfaces 9 of the central or wedge ring section 8.

The adjacent ends of the sections 7, are slightly beveled as at 10 to the end that an abrupt shoulder at the end of each section is eliminated, providing a smooth contact between the ring sections and cylinder wall, to insure against scoring the cylinder wall.

The central or wedge section has its ends constructed so that the outer surfaces thereof are slightly beveled presenting a smooth surface for contact with the cylinder wall.

In the form of the invention as shown by Figure 3 of the drawing, the structure is practically the reverse of that shown by Figure 2, and in this form the side sections of the ring are indicated by the reference character 12, and have their wide surfaces disposed outwardly, the beveled inner surfaces of the sections 12 engaging the beveled surfaces of the inner or wedge ring section 13, to expand the side sections 12 and cause a close fit between the sections and the groove in which they operate.

In the modified form of the invention, the outer surfaces of the split ring sections at the splits or ends thereof, are slightly beveled, presenting a smooth surface for contact with the cylinder wall. The inner or wedge section of the ring in this form of the invention also has its outer surfaces slightly beveled at the point of contact between the split ends of the ring, providing a smooth surface.

Due to the construction shown and described, it will be seen that I have provided a piston packing or ring which is constructed of expandable sections, the sections having cooperating beveled surfaces to cause the ring sections to expand into close engagement with the ring groove in which the ring is positioned, and at the same time provide a tight fit between the ring and cylinder wall.

It will further be seen that because of the slightly beveled outer surfaces of the ring sections, adjacent to the ends thereof, a smooth contact between the ring sections and cylinder wall will be insured at all times preventing scoring of the cylinder wall, due to contact of sharp edges of the ring sections, with the cylinder wall.

What is claimed is:

A piston ring for operating in a cylinder, embodying outer split ring sections having beveled inner surfaces beveled to feather-like edges, and an inner ring section having beveled outer surfaces providing an inner feather-like edge contacting with the beveled inner surfaces of the outer ring sections, said inner ring sections presenting a continuous cylinder wall engaging surface of a width equal to the over-all width of the piston ring, the ends of each section being in contact, and the outer surface of each ring section being beveled towards the ends thereof providing a space between the ring sections and cylinder wall in which the piston operates, eliminating sharp edges at the ends of the split ring sections.

WILLIAM F. COOK.

REFERENCES CITED

The following references are of record in the file of this patent:

UNITED STATES PATENTS

| Number | Name | Date |
|---|---|---|
| 1,079,976 | Cota | Dec. 2, 1913 |
| 1,205,941 | Whiteman | Nov. 21, 1916 |
| 1,365,640 | Copp | Jan. 11, 1921 |
| 1,494,140 | Small | May 13, 1924 |
| 1,535,069 | Weatherwax | Apr. 21, 1925 |
| 1,556,104 | Gregg | Oct. 6, 1925 |
| 1,561,446 | Johnson | Nov. 10, 1925 |
| 2,236,721 | Teetor | Apr. 1, 1941 |
| 2,383,959 | Dick | Sept. 4, 1945 |